(12) United States Patent
Fukushiro et al.

(10) Patent No.: US 12,465,572 B2
(45) Date of Patent: Nov. 11, 2025

(54) EDIBLE IJ INK, TABLET, AND CAPSULE

(71) Applicant: TOPPAN INC., Tokyo (JP)

(72) Inventors: Masato Fukushiro, Tokyo (JP); Yuichi Hoshino, Tokyo (JP); Masatoshi Saito, Tokyo (JP); Hideki Ishikawa, Tokyo (JP)

(73) Assignee: TOPPAN INC., Tokyo (JP)

( * ) Notice: Subject to any disclaimer, the term of this patent is extended or adjusted under 35 U.S.C. 154(b) by 679 days.

(21) Appl. No.: 17/718,486

(22) Filed: Apr. 12, 2022

(65) Prior Publication Data

US 2022/0233451 A1 Jul. 28, 2022

Related U.S. Application Data

(63) Continuation of application No. PCT/JP2020/039435, filed on Oct. 20, 2020.

(30) Foreign Application Priority Data

Oct. 21, 2019 (JP) ................ 2019-192281

(51) Int. Cl.
*A61K 9/28* (2006.01)
*A61K 9/48* (2006.01)

(52) U.S. Cl.
CPC .......... *A61K 9/2893* (2013.01); *A61K 9/2813* (2013.01); *A61K 9/2866* (2013.01); *A61K 9/4891* (2013.01)

(58) Field of Classification Search
None
See application file for complete search history.

(56) References Cited

U.S. PATENT DOCUMENTS

| 4,905,589 A * | 3/1990 | Ackley | B41F 17/36 |
| | | | 198/483.1 |
| 2007/0132823 A1* | 6/2007 | Barreto | C09D 11/30 |
| | | | 347/100 |

FOREIGN PATENT DOCUMENTS

| JP | 2006-169301 A | | 6/2006 | |
| JP | 2015-166424 A | | 9/2015 | |
| JP | 2019044103 A | * | 3/2019 | |
| JP | 2019-094365 A | | 6/2019 | |
| WO | WO-2010059562 A1 | * | 5/2010 | ............. C08B 31/04 |

OTHER PUBLICATIONS

English translation of JP-2019044103-A (Year: 2019).*
SO Freers "Maltodextrin" <https://drugshouce.cn-bj.ufileos.com/pharmaceutical_excipients/6th/Maltodextrin.pdf> (Year: 2009).*
Office Action issued in corresponding Chinese Patent Application No. 202080071285.1, dated Jan. 6, 2023.
Chinese Office Action issued in connection with CN Appl. Ser. No. 202080071285.1 dated Jun. 15, 2023.
International Searching Authority, "International Search Report," issued in connection with International Patent Application No. PCT/JP2020/039435, dated Dec. 21, 2020.
International Searching Authority, "Written Opinion," issued in connection with International Patent Application No. PCT/JP2020/039435, dated Dec. 21, 2020.

* cited by examiner

*Primary Examiner* — Nicole P Babson
(74) *Attorney, Agent, or Firm* — Foley & Lardner LLP

(57) ABSTRACT

An edible IJ ink that has good dispersion stability and printing resumability (intermission resumability), dries quickly, and provides good print quality (for example, prevents streaking), and to provide a tablet and a capsule including a printed part printed using the edible IJ ink, the edible IJ ink comprises water, titanium oxide, a dispersant, a wetting agent, and a water-soluble polysaccharide having a weight average molecular weight smaller than 10,000, and the dispersant includes at least one of sodium carboxymethyl cellulose, sodium alginate, and sodium carbonate.

14 Claims, 2 Drawing Sheets

EDIBLE IJ INK, TABLET, AND CAPSULE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2020/039435, filed on Oct. 20, 2020, which is based upon and claims the benefit of priority to Japanese Patent Application No. 2019-192281, filed on Oct. 21, 2019; the disclosures of which are incorporated herein by reference in their entireties.

TECHNICAL FIELD

The present invention relates to an edible IJ ink, a tablet, and a capsule.

BACKGROUND

Some inks for ink-jet printing (hereinafter also referred to simply as "IJ inks") are edible. A technique related to an edible inkjet ink (hereinafter also referred to simply as an "edible IJ ink") is disclosed, for example, in PTL 1.

CITATION LIST

[Patent Literature] [PTL 1] JP 2006-169301 A

SUMMARY OF THE INVENTION

Technical Problem

For example, there are edible IJ inks that contain water-based pigments. When an IJ ink containing a water-based pigment is used for printing on, for example, the surface of a tablet or capsule with low permeability such as an FC (film-coated) tablet, a sugar-coated tablet, a soft capsule, or a hard capsule, streaks may appear due to the poor wettability of the ink.

In order to improve the wettability of the ink on a tablet having low permeability, an alcohol-based solvent or surfactant, or a solvent that spreads and wets the surface better may be added to the ink. However, the former may deteriorate the dispersion stability or printing resumability (intermission resumability), whereas the latter may reduce the drying speed.

The present invention has been made in light of these circumstances, and an object thereof is to provide an edible IJ ink that has good dispersion stability and printing resumability (intermission resumability), dries quickly, and provides good print quality (for example, prevents streaking), and to also provide a tablet and a capsule including a printed part printed using the edible IJ ink.

Means for Solving the Problem

An edible IJ ink according to an aspect of the present invention comprises water, titanium oxide, a dispersant, a wetting agent, and a water-soluble polysaccharide having a weight average molecular weight smaller than 10,000, and the dispersant includes at least one of sodium carboxymethyl cellulose, sodium alginate, and sodium carbonate.

Advantageous Effects of the Invention

According to an aspect of the present invention, it is possible to reduce the decrease in dispersion stability and printing resumability (intermission resumability), and also reduce the decrease in drying speed and print quality even when it is used for printing on the surface of a tablet with low permeability.

DETAILED DESCRIPTION

Figure 1A:
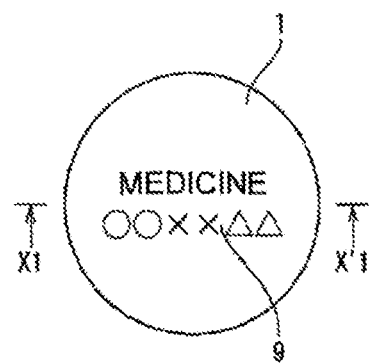
FIGS. 1(a) and 1(b) show a plan view and a cross-sectional view of a first exemplary configuration of a pharmaceutical tablet according to an embodiment.
Figure 1B:
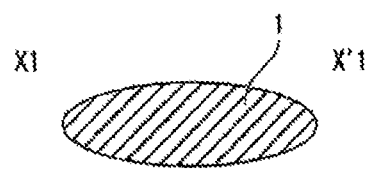

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

An edible IJ ink according to an embodiment of the present invention relates to an IJ ink used to, for example, print characters, an image, or the like on a surface of a pharmaceutical tablet by inkjet printing, in particular, on a surface of a tablet with low permeability. The following description specifically explains an IJ ink according to an embodiment of the present invention, and a tablet and a capsule including a printed part printed using the IJ ink.

[Composition of Edible IJ Ink]

The edible IJ ink according to this embodiment contains at least water, titanium oxide as a pigment, a dispersant, a wetting agent, and a water-soluble polysaccharide having a weight average molecular weight of less than 10,000. The dispersant according to the present embodiment contains at least one of sodium carboxymethyl cellulose, sodium alginate, and sodium carbonate.

When the ink has such composition, it is possible to reduce the decrease in dispersion stability and printing resumability (intermission resumability), and also reduce the decrease in drying speed and print quality even when it is used for printing on the surface of a tablet with low permeability. Each component will be described below in detail.

(Water)

The main solvent of the edible IJ ink according to the present embodiment is water, and for example, may be purified water or deionized water. The term "main solvent" refers to the component having the greatest mass ratio in the solvent as a whole. The ratio of water as the main solvent in the edible IJ ink according to this embodiment is, for example, 50 mass % or more of the total mass of the edible IJ ink.

(Titanium Oxide)

The titanium oxide used in this embodiment is not particularly limited as long as it is edible, and is in the form of fine particles that can be dispersed in ink. The crystal structure of the titanium oxide particles can be any of the anatase type (tetragonal crystal), the rutile type (tetragonal crystal), and the brookite type (orthorhombic crystal).

The titanium oxide content in the ink is preferably in the range of 1 mass % or more and 30 mass % or less, and more preferably in the range of 10 mass % or more and 20 mass % or less. When the titanium oxide content exceeds the upper limit (30 mass %), the printing resumability may deteriorate, and when it is lower than the lower limit (1 mass %), it may degrade the ink's color development.

The average dispersed particle size (average primary particle size) of titanium oxide affects the printing resumability since it affects, for example, the precipitation of the particles inside the inkjet head, and thus the particle size may be set as appropriate taking this into consideration. Specifically, the average dispersed particle size of titanium oxide in terms of median diameter D50 is preferably in the range of 30 nm or more and 800 nm or less, more preferably in the range of 50 nm or greater and 600 nm or smaller, and particularly preferably in the range of 100 nm or greater and 500 nm or smaller. When the average dispersed particle size of titanium oxide is smaller than 30 nm, the dispersion stability and the ink's color development may deteriorate, and when it is greater than 800 nm, the printing resumability may deteriorate due to reasons such as precipitation of titanium oxide particles. The average dispersed particle size of titanium oxide may be determined using, for example, laser diffraction analysis.

(Dispersant)

The dispersant used in the present embodiment contains at least one of sodium carboxymethyl cellulose, sodium alginate, and sodium carbonate.

The dispersant content with respect to titanium oxide, which is the pigment, is preferably in the range of 0.1 parts by mass or more and 10 parts by mass or less, and more preferably in the range of 1 part by mass or more and 5 parts by mass or less. When the dispersant content is smaller than 0.1 part by mass, the printing resumability may deteriorate due to the titanium oxide not being able to be dispersed in water, and a dispersant content greater than 10 parts by mass may cause the ink's viscosity to increase and degrade its printing resumability.

(Wetting Agent)

The wetting agent added to the edible IJ ink according to the present embodiment is not particularly limited as long as it is an agent generally added to IJ ink as a wetting agent.

The wetting agent used in this embodiment preferably has a high boiling point. A "high boiling point" refers to, for example, a boiling point of 140° C. or higher. Specific examples of wetting agents that can be used in the present embodiment include, for example, ethylene glycol, propylene glycol, diethylene glycol, triethylene glycol, pentamethylene glycol, trimethylene glycol, 2-butene-1,4-diol, 2-ethyl-1,3-hexanediol, 2-methyl-2,4-pentanediol, tripropylene glycol, polyethylene glycol with a number average molecular weight of 2000 or smaller, 1,3-propylene glycol, isopropylene glycol, isobutylene glycol, glycerin, meso-erythritol, pentaerythritol, 2-pyrrolidone, N-methyl-2-pyrrolidone, and N-ethyl-2-pyrrolidone. Of these wetting agents, a wetting agent containing at least one of propylene glycol and glycerin is particularly preferable. When the wetting agent has such a composition, it can impart sufficient printing resumability to the edible IJ ink. A single kind of wetting agent or a combination of two or more kinds of wetting agents may be used in this embodiment.

The wetting agent content with respect to the total mass of the edible IJ ink is preferably in the range of 20 mass % or more and 50 mass % or less, and more preferably in the range of 30 mass % or more and 40 mass % or less. When the wetting agent content is less than 20 mass %, the ink may dry faster and the printing resumability may deteriorate, and a wetting agent content greater than 50 mass % may cause the ink's viscosity to increase and degrade its printing resumability.

(Water-Soluble Polysaccharide)

The water-soluble polysaccharide used in this embodiment is not particularly limited as long as it is soluble in water and has a weight average molecular weight smaller than 10,000. Examples of water-soluble polysaccharides that can be used in this embodiment include, for example, starches such as corn starch and wheat starch, and enzymatic degradation products thereof; cellulose-based substances such as carboxymethyl cellulose and hydroxymethyl cellulose; polysaccharides such as sodium alginate, arabic gum, locust bean gum, tragacanth gum, guar gum, and tamarind seeds; and disaccharides such as oligosaccharides, trehalose, and isomaltulose. The water-soluble polysaccharide used in this embodiment may contain at least one of maltodextrin, trehalose, and reduced isomaltulose.

A weight average molecular weight of the water-soluble polysaccharide equal to or more than 10,000 may increase the ink's viscosity or accelerate the ink's drying, which may in turn degrade the printing resumability. The weight average molecular weight of the water-soluble polysaccharide is preferably 300 or more, and more preferably 1,000 or more. When the weight average molecular weight of the water-soluble polysaccharide is smaller than 300, the ink may dry too slowly.

The water-soluble polysaccharide content with respect to the total mass of the edible IJ ink is preferably in the range of 0.1 mass % or more and 5 mass % or less. When the water-soluble polysaccharide content is less than 0.1 mass %, the print quality may deteriorate, and when it exceeds 5 mass %, the printing resumability may deteriorate. In this embodiment, "water-soluble" means that 0.001 part by mass or more of the substance can dissolve in 1 part by mass of water. The weight average molecular weight values of this embodiment are values measured by GPC (gel permeation chromatography). Further, in this embodiment, a "polysaccharide" refers to a saccharide including two or more polymerized monosaccharides.

(Printing Method)

Since the edible IJ ink according to this embodiment can be applied to commercially available inkjet devices, it has a wide range of applications and is highly useful. Although the following examples show print examples obtained by so-called drop-on-demand inkjet printing using a piezoelectric element (piezoelectric ceramic) as the actuator, printing may be carried out by another method. Other drop-on-demand inkjet printing examples include thermal inkjet printing which is performed by ejecting the IJ ink using water vapor pressure generated by instantaneously heating a micro heater element to a high temperature (of 200° C. to 300° C.), electrostatic printing which is performed by ejecting the IJ ink by electrostatically vibrating the actuator, and ultrasonic printing which utilizes the ultrasonic cavitation phenomenon. It is also possible to use a continuous inkjet method if the IJ ink can be electrically charged.

(Applicable Tablets)

The edible IJ ink according to the present embodiment can improve the quality of an image printed on the surface of a pharmaceutical tablet or capsule by inkjet printing. Examples of the "pharmaceutical tablet" include a film coated tablet having an outermost surface on which a water-soluble surface layer is formed, as well as an uncoated tablet (bare tablet), a sugar-coated tablet, an enteric tablet, and an orally disintegrating tablet. Examples of "pharmaceutical capsules" include hard capsules and soft capsules. An example of a hard or soft capsule is a capsule that consists of a cylindrical body and a cap, and is formed by packing the substance to be contained, which is typically powder or granular, possibly mixed with one or more other powder ingredients, into the body made of gelatin or a plant-derived material, and closing its opening with the cap.

The following description explains the structure of a pharmaceutical tablet having a printed image printed using the edible IJ ink according to the present embodiment.

FIGS. 1(a) and (b) are a plan view showing a first structure example of a pharmaceutical tablet according to this embodiment, and a cross-sectional view taken along X1-X'1 of this plan view, respectively. The pharmaceutical tablet shown in FIGS. 1(a) and (b) is an uncoated tablet that has an image 9 printed on the surface of its base 1. This image 9 can be any kind of image such as characters, symbols, or a barcode, and it is printed by inkjet printing using the edible IJ ink according to the present embodiment.

Figure 2A:
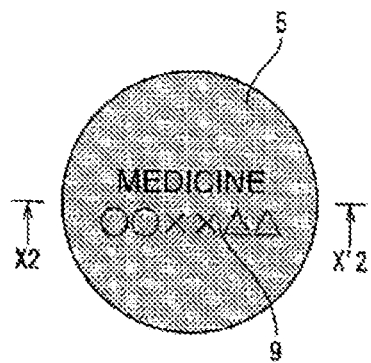
FIGS. 2(a) and 2(b) show a plan view and a cross-sectional view of a second exemplary configuration of a pharmaceutical tablet according to an embodiment.
Figure 2B:
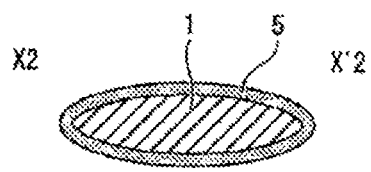

FIGS. 2(a) and (b) are a plan view showing a second structure example of a pharmaceutical tablet according to this embodiment, and a cross-sectional view taken along X2-X'2 of this plan view, respectively. The pharmaceutical tablet shown in FIGS. 2(a) and (b) is a film-coated tablet that has an image 9 printed on the surface of a film 5 covering its base 1. As with the image 9 shown in FIGS. 1(a) and (b), the image 9 shown in FIGS. 2(a) and (b) is also printed by inkjet printing using the edible IJ ink according to the present embodiment.

There is no particular limitation on the active ingredients contained in the pharmaceutical tablet. Examples of the active ingredients include a substance effective for preventing or treating various diseases (e.g., a substance having sleep-inducing effect, an tranquilizer activity, an antibacterial activity, an antihypertensive effect, an anti-angina activity, an analgesic effect, an anti-inflammatory activity, a tranquilizing effect, a diabetes treatment activity, a diuretic effect, an anticholinergic activity, an anti-hyperacidity effect, an antiepileptic effect, an ACE inhibitory activity, a β-receptor antagonist or agonist activity, an anesthetic action, an appetite suppressant action, an antiarrhythmic effect, an antidepressant effect, an anticoagulant activity, an antidiarrheal effect, an antihistamine activity, an antimalarial effect, an antitumor activity, an immunosuppressive activity, an antiparkinsonian effect, an antipsychotic effect, an antiplatelet activity, an antihyperlipidemic effect, and the like), a substance having a scavenging effect, and a substance having a scent or a deodorant action, but are not limited thereto.

The tablet according to the present embodiment may as necessary contain a carrier that is acceptable for its application, together with an active ingredient. For example, pharmaceutical tablets may comprise carriers which are tolerated from pharmaceutical perspectives. As carriers tolerated from pharmaceutical perspectives, various organic or inorganic carriers that are commonly used as pharmaceutical materials are used. For example, an excipient, lubricant, binder, disintegrant, and/or thickener may be mixed as appropriate in appropriate amounts. Additives such as a preservative, antioxidant, colorant, and/or sweetener may be added as necessary.

Although the present embodiment has been described using a pharmaceutical tablet as an example of a tablet, the present embodiment is not limited to this. The object on which an image is printed using the edible IJ ink according to the present embodiment is not particularly limited. For example, an image may be printed on the surface of a feed tablet, a fertilizer tablet, a cleaning agent tablet, a food tablet such as a compressed candy tablet, or any other appropriate tablet. The edible IJ ink of the present embodiment does not particularly limit the size of the object on which an image is printed, but may be applied to tablets of various sizes. Instead of applying it directly to the surface of a tablet as described above, the edible IJ ink of the present embodiment may be applied to a package that comes into direct contact with a pharmaceutical product or food.

The pharmaceutical tablet of the present embodiment is not particularly limited, but the ink tends to be even more effective when the tablet is a film-coated tablet having a film coating layer on its surface. This is because the surface of a film-coated tablet has less pores than the surface of an uncoated tablet, which helps the ink to remain on the tablet surface to which it has been applied. Therefore, the edible IJ ink according to the present embodiment tends to have an enhanced quick-drying effect as compared with the edible IJ ink according to the prior art.

(Effects of the Present Embodiment)

(1) The edible IJ ink according to the present embodiment includes water, titanium oxide, a dispersant, a wetting agent, and a water-soluble polysaccharide having a weight average molecular weight smaller than 10,000. The dispersant includes at least one of sodium carboxymethyl cellulose, sodium alginate, and sodium carbonate.

When the ink has such composition, it is possible to reduce the decrease in dispersion stability and printing resumability (intermission resumability), and also reduce the decrease in drying speed and print quality even when it is used for printing on the surface of a tablet with low permeability.

(2) The water-soluble polysaccharide having a weight average molecular weight smaller than 10,000 included in the edible IJ ink according to the present embodiment may contain at least one of maltodextrin, trehalose, and reduced isomaltulose.

A water-soluble polysaccharide having such composition can make the ink dry fast enough for use, and at the same time reduce the decrease in printing resumability.

(3) The content of the water-soluble polysaccharide having a weight average molecular weight smaller than 10,000 in the edible IJ ink according to the present embodiment may be in the range of 0.1 mass % or more and 5 mass % or less with respect to the total mass of the edible IJ ink.

A water-soluble polysaccharide having such composition can make the edible IJ ink dry fast enough, and at the same time further reduce the decrease in printing resumability.

(4) The median diameter D50 of the titanium oxide included in the edible IJ ink according to the present embodiment may be in the range of 30 nm or more and 800 nm or less, and the titanium oxide may be dispersed in the edible IJ ink.

This makes it possible to further reduce the decrease in printing resumability.

(5) The content of the wetting agent in the edible IJ ink according to the present embodiment may be in the range of 20 mass % or more and 50 mass % or less with respect to the total mass of the edible IJ ink.

This makes it possible to further reduce the decrease in printing resumability.

(6) The edible IJ ink according to the present invention may be used to print an image directly on a tablet surface, a soft capsule surface, or a hard capsule surface, or food.

This enables direct printing on the surface of a tablet, food, or the like, and also the ink may be used for printing on a package that comes into direct contact with a pharmaceutical product or food.

(7) The tablet of the present embodiment is provided with a printed part (printed image) which has been printed using the edible IJ ink described above.

This makes the printed part (printed image part) on the surface of the tablet edible.

(8) The capsule of the present embodiment is provided with a printed part (printed image) which has been printed using the edible IJ ink described above.

This makes the printed part (printed image part) on the surface of the capsule edible.

(9) The tablet of the present embodiment may be a pharmaceutical tablet.

This makes the printed image part on the surface of the pharmaceutical tablet edible.

(10) The capsule of the present embodiment may be a pharmaceutical capsule.

This makes the printed image part on the surface of the pharmaceutical capsule edible.

Examples

The present invention will be described in more detail by way of examples; however, the present invention is not limited to the examples.

(Preparation of Edible IJ Ink)

The preparation process of the edible IJ ink examples will be described.

First, an edible IJ ink was prepared. The ink according to this example contains water, titanium oxide, a dispersant, a wetting agent, and a water-soluble polysaccharide having a weight average molecular weight of less than 10,000.

The ink preparation process will be described in order.

First, a dispersant and titanium oxide were added to water. The mixture solution containing water, the dispersant, and titanium oxide was placed in a paint shaker, which serves as a disperser, and shaken for 1 to 3 hours to break down and disperse the particles and obtain a dispersion.

The wetting agent and water-soluble polysaccharide were added to and dispersed in the obtained dispersion as necessary, and thus the ink was prepared.

Deionized water was used as the water for preparing the ink, and propylene glycol (PG) was used as the wetting agent. The maltodextrin used in the examples is a maltodextrin manufactured by Matsutani Chemical Industry Co., Ltd. having a DE value between 17 and 19.

A total of 59 edible IJ inks, Examples 1 to 52 and Comparative Examples 1 to 7, each having different composition, were prepared in such a manner. The composition of each ink is shown in Tables 1 to 4. The dispersants contained in the edible IJ inks of Examples 1 to 52 include at least one of sodium carboxymethyl cellulose, sodium alginate, and sodium carbonate. Further, the dispersant content in the edible IJ inks of Examples 1 to 52 was 0.01 to 0.1 times the pigment content.

Solid foreign matter in the liquid was removed by passing each of the 59 inks having different composition through a membrane filter. In detail, each ink was passed through a (cellulose acetate film) membrane filter having a pore size of 5.0 µM once. Subsequently, each ink was passed through a (cellulose acetate film) membrane filter having a pore size of 0.8 µM once to thereby obtain a purified ink.

With regard to the water-soluble polysaccharide, the greater the molecular weight, the more difficult it is to obtain a material having a narrow molecular weight distribution. Therefore, in the examples, water-soluble polysaccharides having a weight average molecular weight of 1,000 to 9,000, 2,000 to 4,000, or 10,000 to 30,000 were used.

TABLE 1

| | General prescriptions | | | | | | | |
|---|---|---|---|---|---|---|---|---|
| | Pigment | | | Disperant | | | Others | Main solvent |
| Sample No. | Kind | Particle size (D50) | Concentration | CMC-Na (mass %) | Na2CO3 (mass %) | Alg-Na (mass %) | (kind mass %) | Water (mass %) |
| Comp. Ex. 1 | Titanium oxide | 200 nm | 5% | 0.08% | 0.08% | — | — | 54.85% |
| Comp. Ex. 2 | Titanium oxide | 200 nm | 10% | 0.15% | 0.15% | — | — | 49.70% |
| Comp. Ex. 3 | Titanium oxide | 200 nm | 20% | 0.30% | 0.30% | — | — | 39.40% |
| Comp. Ex. 4 | Titanium oxide | 200 nm | 10% | 0.15% | 0.15% | — | — | 89.70% |
| Comp. Ex. 5 | Titanium oxide | 200 nm | 10% | 0.15% | 0.15% | — | — | 49.70% |
| Comp. Ex. 6 | Titanium oxide | 200 nm | 10% | — | — | — | Glyceride 0.30% | 49.20% |

TABLE 1-continued

| Sample No. | Pigment | Size | % | | | | Other | Final % |
|---|---|---|---|---|---|---|---|---|
| Comp. Ex. 7 | Titanium oxide | 200 nm | 10% | — | — | — | Sucrose fatty acid ester 0.30% | 44.70% |
| Ex. 1 | Titanium oxide | 200 nm | 10% | 0.15% | 0.15% | — | — | 49.20% |
| Ex. 2 | Titanium oxide | 200 nm | 10% | 0.15% | 0.15% | — | — | 48.70% |
| Ex. 3 | Titanium oxide | 200 nm | 10% | 0.15% | 0.15% | — | — | 48.70% |
| Ex. 4 | Titanium oxide | 200 nm | 10% | 0.15% | 0.15% | — | — | 49.60% |
| Ex. 5 | Titanium oxide | 200 nm | 10% | 0.15% | 0.15% | — | — | 44.70% |
| Ex. 6 | Titanium oxide | 200 nm | 10% | 0.15% | 0.15% | — | — | 48.20% |
| Ex. 7 | Titanium oxide | 200 nm | 1% | 0.02% | 0.02% | — | — | 53.97% |
| Ex. 8 | Titanium oxide | 200 nm | 5% | 0.08% | 0.08% | — | — | 94.35% |

| Sample No. | Wetting agent PG (mass %) | Water soluble polysaccharide Name (mass %) | WAMW | Dispersion stability evaluation | Printing Evaluation Streaking Cap. 1 | Printing Evaluation Streaking Cap. 2 | Transfer resistance | Printing resumability |
|---|---|---|---|---|---|---|---|---|
| Comp. Ex. 1 | 40% | — | — | Good | Poor | Poor | Poor | Excellent |
| Comp. Ex. 2 | 40% | — | — | Good | Poor | Poor | Poor | Excellent |
| Comp. Ex. 3 | 40% | — | — | Good | Poor | Poor | Poor | Good |
| Comp. Ex. 4 | | Trehalose 5% | 350 | Good | Excellent | Excellent | Good | Poor |
| Comp. Ex. 5 | 40% | Dextran 0.1% | 10000-30000 | Good | Excellent | Excellent | Excellent | Poor |
| Comp. Ex. 6 | 40% | Maltodextrin 0.5% | 1000-9000 | Poor | Excellent | Excellent | Excellent | Good |
| Comp. Ex. 7 | 40% | Trehalose 5% | 350 | Poor | Excellent | Excellent | Excellent | Good |
| Ex. 1 | 40% | Maltodextrin 0.5% | 1000-9000 | Good | Excellent | Excellent | Excellent | Excellent |
| Ex. 2 | 40% | Trehalose 1% | 350 | Good | Good | Good | Excellent | Excellent |
| Ex. 3 | 40% | Reduced isomaltulose 1% | 350 | Good | Good | Good | Excellent | Excellent |
| Ex. 4 | 40% | Maltodextrin 0.1% | 1000-9000 | Good | Good | Good | Excellent | Excellent |
| Ex. 5 | 40% | Trehalose 5% | 350 | Good | Good | Excellent | Excellent | Excellent |
| Ex. 6 | 40% | Maltodextrin 0.5% / Trehalose 1% | 1000-9000 / 350 | Good | Good | Excellent | Excellent | Excellent |
| Ex. 7 | 40% | Trehalose 5% | 350 | Good | Good | Excellent | Excellent | Excellent |
| Ex. 8 | | Maltodextrin 0.5% | 1000-9000 | Good | Excellent | Excellent | Excellent | Excellent |

TABLE 2

| Sample No. | Pigment Kind | Pigment Particle size (D50) | Pigment Concentration | Dispersant CMC-Na (mass %) | Dispersant Na2CO3 (mass %) | Dispersant Alg-Na (mass %) | Others (kind, mass %) | Main solvent Water (mass %) |
|---|---|---|---|---|---|---|---|---|
| Ex. 9 | Titanium oxide | 200 nm | 15% | 0.23% | 0.23% | — | — | 44.05% |
| Ex. 10 | Titanium oxide | 200 nm | 20% | 0.30% | 0.30% | — | — | 38.90% |
| Ex. 11 | Titanium oxide | 200 nm | 30% | 0.45% | 0.45% | — | — | 28.10% |
| Ex. 12 | Titanium oxide | 30 nm | 15% | 0.23% | 0.23% | — | — | 44.05% |
| Ex. 13 | Titanium oxide | 100 nm | 10% | 0.15% | 0.15% | — | — | 44.70% |
| Ex. 14 | Titanium oxide | 500 nm | 10% | 0.15% | 0.15% | — | — | 49.20% |
| Ex. 15 | Titanium oxide | 800 nm | 10% | 0.15% | 0.15% | — | — | 49.20% |
| Ex. 16 | Titanium oxide | 200 nm | 5% | 0.15% | — | — | — | 64.35% |
| Ex. 17 | Titanium oxide | 200 nm | 5% | — | 0.15% | — | — | 64.35% |
| Ex. 18 | Titanium oxide | 200 nm | 10% | 0.15% | 0.15% | — | — | 39.20% |
| Ex. 19 | Titanium oxide | 200 nm | 10% | 0.15% | 0.15% | — | — | 69.20% |
| Ex. 20 | Titanium oxide | 200 nm | 10% | 0.15% | 0.15% | — | — | 64.70% |
| Ex. 21 | Titanium oxide | 1000 nm | 5% | 0.08% | 0.08% | — | — | 73.85% |
| Ex. 22 | Titanium oxide | 1000 nm | 5% | 0.08% | 0.08% | — | — | 73.85% |
| Ex. 23 | Titanium oxide | 1000 nm | 5% | 0.08% | 0.08% | — | — | 74.85% |

| Sample No. | Wetting agent PG (mass %) | Water-soluble polysaccharide Name (mass %) | WAMW | Dispersion stability evaluation | Printing evaluation Streaking Cap. 1 | Printing evaluation Streaking Cap. 2 | Transfer resistance | Printing resumability |
|---|---|---|---|---|---|---|---|---|
| Ex. 9 | 40% | Maltodextrin 0.5% | 1000-9000 | Good | Excellent | Excellent | Good | Good |
| Ex. 10 | 40% | Maltodextrin 0.5% | 1000-9000 | Good | Excellent | Excellent | Good | Good |
| Ex. 11 | 40% | Trehalose 1% | 350 | Good | Good | Good | Good | Good |
| Ex. 12 | 40% | Maltodextrin 0.5% | 1000-9000 | Good | Excellent | Excellent | Good | Good |
| Ex. 13 | 40% | Trehalose 5% | 350 | Good | Good | Excellent | Excellent | Good |
| Ex. 14 | 40% | Maltodextrin 0.5% | 1000-9000 | Good | Good | Good | Excellent | Good |
| Ex. 15 | 40% | Maltodextrin 0.5% | 1000-9000 | Good | Good | Good | Excellent | Good |
| Ex. 16 | 30% | Maltodextrin 0.5% | 1000-9000 | Good | Excellent | Excellent | Excellent | Excellent |
| Ex. 17 | 30% | Maltodextrin 0.5% | 1000-9000 | Good | Excellent | Excellent | Excellent | Excellent |
| Ex. 18 | 50% | Maltodextrin 0.5% | 1000-9000 | Good | Excellent | Excellent | Good | Good |
| Ex. 19 | 20% | Maltodextrin 0.5% | 1000-9000 | Good | Excellent | Excellent | Excellent | Good |
| Ex. 20 | 20% | Trehalose 5% | 350 | Good | Good | Excellent | Excellent | Good |
| Ex. 21 | 15% | Polydextrose 6% | 2000-4000 | Good | Good | Good | Good | Good |
| Ex. 22 | 15% | Trehalose 6% | 350 | Good | Good | Good | Good | Good |
| Ex. 23 | 15% | Polydextrose 5% | 2000-4000 | Good | Good | Good | Good | Good |

TABLE 3

| Sample No. | Pigment Kind | Pigment Particle size (D50) | Pigment Concentration | Dispersant CMC-Na (mass %) | Dispersant Na2CO3 (mass %) | Dispersant Alg-Na (mass %) | Others (kind, mass %) | Main solvent Water (mass %) |
|---|---|---|---|---|---|---|---|---|
| Ex. 24 | Titanium oxide | 200 nm | 10% | 0.15% | 0.15% | — | — | 68.70% |
| Ex. 25 | Titanium oxide | 1000 nm | 5% | 0.08% | 0.08% | — | — | 48.85% |
| Ex. 26 | Titanium oxide | 200 nm | 10% | — | 0.15% | 0.15% | — | 49.20% |
| Ex. 27 | Titanium oxide | 200 nm | 10% | — | 0.30% | 0.30% | — | 54.40% |
| Ex. 28 | Titanium oxide | 200 nm | 10% | — | 0.08% | 0.08% | — | 54.85% |
| Ex. 29 | Titanium oxide | 200 nm | 10% | — | 0.15% | 0.15% | — | 48.70% |
| Ex. 30 | Titanium oxide | 200 nm | 10% | — | 0.15% | 0.15% | — | 48.70% |
| Ex. 31 | Titanium oxide | 200 nm | 10% | — | 0.15% | 0.15% | — | 49.60% |
| Ex. 32 | Titanium oxide | 200 nm | 10% | — | 0.15% | 0.15% | — | 44.70% |
| Ex. 33 | Titanium oxide | 200 nm | 10% | — | 0.15% | 0.15% | — | 48.20% |
| Ex. 34 | Titanium oxide | 200 nm | 1% | — | 0.02% | 0.02% | — | 53.97% |
| Ex. 35 | Titanium oxide | 200 nm | 5% | — | 0.08% | 0.08% | — | 64.35% |
| Ex. 36 | Titanium oxide | 200 nm | 15% | — | 0.23% | 0.23% | — | 44.05% |
| Ex. 37 | Titanium oxide | 200 nm | 20% | — | 0.30% | 0.30% | — | 38.90% |
| Ex. 38 | Titanium oxide | 200 nm | 30% | — | 0.45% | 0.45% | — | 28.10% |

| Sample No. | Wetting agent PG (mass %) | Water-soluble polysaccharide Name (mass %) | WAMW | Dispersion stability evaluation | Printing evaluation Streaking Cap. 1 | Printing evaluation Streaking Cap. 2 | Transfer resistance | Printing resumability |
|---|---|---|---|---|---|---|---|---|
| Ex. 24 | 15% | Indigestible dextrin 6% | 2000-4000 | Good | Good | Good | Good | Good |
| Ex. 25 | 40% | Polydextrose 6% | 2000-4000 | Good | Good | Good | Good | Good |
| Ex. 26 | 40% | Maltodextrin 0.5% | 1000-9000 | Good | Excellent | Excellent | Excellent | Excellent |
| Ex. 27 | 30% | Maltodextrin 5% | 1000-9000 | Good | Excellent | Excellent | Excellent | Excellent |
| Ex. 28 | 30% | Maltodextrin 5% | 1000-9000 | Good | Excellent | Excellent | Excellent | Good |
| Ex. 29 | 40% | Trehalose 1% | 350 | Good | Good | Good | Excellent | Excellent |
| Ex. 30 | 40% | Reduced isomaltulose 1% | 350 | Good | Good | Good | Excellent | Excellent |
| Ex. 31 | 40% | Maltodextrin 0.1% | 1000-9000 | Good | Good | Good | Excellent | Excellent |
| Ex. 32 | 40% | Trehalose 5% | 350 | Good | Good | Excellent | Excellent | Excellent |
| Ex. 33 | 40% | Maltodextrin 0.5% / Trehalose 1% | 1000-9000 / 350 | Good | Good | Excellent | Excellent | Excellent |
| Ex. 34 | 40% | Trehalose 5% | 350 | Good | Good | Excellent | Excellent | Excellent |
| Ex. 35 | 30% | Maltodextrin 0.5% | 1000-9000 | Good | Excellent | Excellent | Excellent | Excellent |
| Ex. 36 | 40% | Maltodextrin 0.5% | 1000-9000 | Good | Excellent | Excellent | Good | Excellent |

TABLE 3-continued

| Sample No. | PG (mass %) | Name (mass %) | WAMW | Dispersion stability evaluation | Streaking Cap. 1 | Streaking Cap. 2 | Transfer resistance | Printing resumability |
|---|---|---|---|---|---|---|---|---|
| Ex. 37 | 40% | Maltodextrin 0.5% | 1000-9000 | Good | Excellent | Excellent | Good | Excellent |
| Ex. 38 | 40% | Trehalose 1% | 350 | Good | Good | Good | Good | Excellent |

TABLE 4

| | General prescription | | | | | | | | | | | | |
|---|---|---|---|---|---|---|---|---|---|---|---|---|---|
| | Pigment | | | Dispersant | | | | Main solvent | Wetting agent | Water-soluble polysaccharide | | Dispersion stability evaluation | Printing evaluation |
| Sample No. | Kind | Particle size (D50) | Concentration | CMC-Na (mass %) | Na2CO3 (mass %) | Alg-Na (mass %) | Others (kind, mass %) | Water (mass %) | PG (mass %) | Name (mass %) | WAMW | | Streaking Cap. 1 / Cap. 2 / Transfer resistance / Printing resumability |
| Ex. 39 | Titanium oxide | 30 nm | 15% | — | 0.23% | 0.23% | — | 44.05% | 40% | Maltodextrin 0.5% | 1000-9000 | Good | Excellent / Excellent / Good / Excellent |
| Ex. 40 | Titanium oxide | 100 nm | 10% | — | 0.15% | 0.15% | — | 44.70% | 40% | Trehalose 5% | 350 | Good | Good / Excellent / Excellent / Excellent |
| Ex. 41 | Titanium oxide | 500 nm | 10% | — | 0.15% | 0.15% | — | 49.20% | 40% | Maltodextrin 0.5% | 1000-9000 | Good | Good / Good / Excellent / Excellent |
| Ex. 42 | Titanium oxide | 800 nm | 10% | — | 0.15% | 0.15% | — | 49.20% | 40% | Maltodextrin 0.5% | 1000-9000 | Good | Good / Good / Excellent / Excellent |
| Ex. 43 | Titanium oxide | 200 nm | 5% | — | — | 0.15% | — | 64.35% | 30% | Maltodextrin 0.5% | 1000-9000 | Good | Excellent / Excellent / Excellent / Excellent |
| Ex. 44 | Titanium oxide | 200 nm | 10% | 0.10% | 0.10% | 0.10% | — | 59.20% | 30% | Maltodextrin 0.5% | 1000-9000 | Good | Excellent / Excellent / Excellent / Excellent |
| Ex. 45 | Titanium oxide | 200 nm | 10% | — | 0.15% | 0.15% | — | 39.20% | 50% | Maltodextrin 0.5% | 1000-9000 | Good | Excellent / Excellent / Good / Excellent |
| Ex. 46 | Titanium oxide | 200 nm | 10% | — | 0.15% | 0.15% | — | 69.20% | 20% | Maltodextrin 0.5% | 1000-9000 | Good | Excellent / Excellent / Excellent / Excellent |
| Ex. 47 | Titanium oxide | 200 nm | 10% | — | 0.15% | 0.15% | — | 64.70% | 20% | Trehalose 5% | 350 | Good | Good / Excellent / Excellent / Excellent |
| Ex. 48 | Titanium oxide | 1000 nm | 5% | — | 0.08% | 0.08% | — | 73.85% | 15% | Polydextrose 6% | 2000-4000 | Good | Good / Good / Good / Excellent |
| Ex. 49 | Titanium oxide | 1000 nm | 5% | — | 0.08% | 0.08% | — | 73.85% | 15% | Trehalose 6% | 350 | Good | Good / Good / Good / Excellent |
| Ex. 50 | Titanium oxide | 1000 nm | 5% | — | 0.08% | 0.08% | — | 74.85% | | | | | |
| Ex. 51 | Titanium oxide | 200 nm | 10% | — | 0.15% | 0.15% | — | 68.70% | | | | | |
| Ex. 52 | Titanium oxide | 1000 nm | 5% | — | 0.08% | 0.08% | — | 48.85% | | | | | |

TABLE 4-continued

| Ex. 50 | 15% | Polydextrose 5% | 2000-4000 | Good | Good | Good | Good | Excellent |
| Ex. 51 | 15% | Indigestible dextrin 6% | 2000-4000 | Good | Good | Good | Good | Excellent |
| Ex. 52 | 40% | Polydextrose 6% | 2000-4000 | Good | Good | Good | Good | Excellent |

The dispersion stability, printing resumability, transfer resistance, and streaking of the edible IJ inks of Examples 1 to 52 and Comparative Examples 1 to 7 were evaluated. The evaluation results are shown in Tables 1 to 4. The examples were evaluated as follows.

(1) Evaluation of Dispersion Stability

After leaving the edible IJ inks of Examples 1 to 52 and Comparative Examples 1 to 7 for 14 days at 40° C., the median diameter of the titanium oxide as a pigment was measured. An increase in the median diameter indicates that the pigment particles have agglomerated and thus the dispersion stability is low. The evaluation criteria are as follows.

Good: No significant change in the median diameter

Poor: Clear increase in particle size

"No significant change in the median diameter" means that the median diameter of the particles after leaving the ink for 14 days at 40° C. has increased by no more than 10 nm from the median diameter of the particles immediately after the ink preparation. "Clear increase in particle size" means that the amount of increase in median diameter exceeds 10 nm.

The dispersion stability ratings of Examples 1 to 52 were all "Good", whereas the dispersion stability ratings of Comparative Examples 6 and 7 were "Poor".

(2) Evaluation of Printing Resumability

A piezoelectric ceramic-driven drop-on-demand inkjet head having a print resolution of 600 dpi in the main scanning direction, 600 dpi in the sub-scanning direction (conveyance direction of the recording medium, such as a tablet), and having 2,656 nozzles in total was left for a predetermined time (15 to 60 minutes) without performing flushing. After that, a test pattern was printed at a printing droplet amount of 6 pl per drop. All of the nozzles were able to discharge ink with no decrease in the amount of discharge. The ratings shown in Tables 1 to 4 represent the results of a printing resumability test performed by measuring the time it took until the ink could no longer be discharged. The evaluation criteria are as follows.

Excellent: 30 minutes or more and less than 60 minutes

Good: 15 minutes or more and less than 30 minutes

Poor: Less than 15 minutes

The printing resumability (intermission resumability) ratings of Examples 1 to 52 were all "Good" or "Excellent", whereas the printing resumability (intermission resumability) ratings of Comparative Examples 4 and 5 were "Poor".

(3) Evaluation of Transfer Resistance (Drying Speed Test)

Using a piezoelectric ceramic-driven drop-on-demand inkjet head having a print resolution of 600 dpi in the main scanning direction, 600 dpi in the sub-scanning direction (conveyance direction of the recording medium, such as a tablet), and having 2,656 nozzles in total, an image was printed on the tablet described below at a printing droplet amount of 10 pl per drop.

After waiting for 10 seconds after printing, a black sheet of paper attached to a digital force gauge was brought into contact with the tablet on which an image had been printed and a pressure of 4 to 5 N was applied for 0.4 to 0.5 seconds to check if there is any ink transfer. The transfer resistance (drying speed) ratings shown in Tables 1 to 4 represent the evaluation results obtained by visually observing the transferred ink and assessing its darkness. The evaluation criteria are as follows.

Excellent: No ink transfer

Good: Little ink transfer, hardly visible spotted

Poor: Clear ink transfer

The transfer resistance ratings of Examples 1 to 52 were all "Good" or "Excellent", whereas the transfer resistance (drying speed) ratings of Comparative Examples 1 to 3 were "Poor".

Tablet (Film-Coated Tablet)

A tablet whose surface is coated with a coating layer formed by adding a polyethylene glycol pigment, a titanium oxide pigment, or the like to hydroxypropyl cellulose, hydroxypropyl methyl cellulose, or the like.

(4) Evaluation of Streaks

Using a piezoelectric ceramic-driven drop-on-demand inkjet head having a print resolution of 600 dpi in the main scanning direction, 600 dpi in the sub-scanning direction (conveyance direction of the recording medium, such as a tablet), and having 2,656 nozzles in total, solid images were printed on the two soft capsules 1 and 2 described below at a printing droplet amount of 10 pl per drop.

The printed images thus obtained were visually observed for streaking evaluation according to the following criteria. The evaluation criteria are as follows.

Excellent: Uniform ink distribution and no streaking of ink on the solid images

Good: Slight streaking of ink on the solid images, but not to an extent that would be a problem in practical use Poor: Clear streaking of ink on the solid images to an extent that would be a problem in practical use The streaking ratings of Examples 1 to 52 were all "Good" or "Excellent", whereas the streaking ratings of Comparative Examples 1 to 3 were "Poor".

Soft Capsule 1 (Gelatin Capsule)

A soft capsule formed by coating the surface of a capsule with a gelatin coating layer.

Soft Capsule 2 (HPMC Capsule)

A soft capsule formed by coating the surface of a capsule with a coating layer of hydroxypropyl cellulose, hydroxypropyl methyl cellulose, or the like.

It can be seen from the above results that an edible IJ ink including water, titanium oxide, a dispersant containing at least one of sodium carboxymethyl cellulose, sodium alginate, and sodium carbonate, a wetting agent, and a water-soluble polysaccharide having a weight average molecular weight of less than 10,000 can reduce the decrease in dispersion stability and printing resumability (intermission resumability), and reduce the decrease in drying speed and print quality even when printing is performed on the surface of a tablet having low permeability.

REFERENCE SIGNS LIST

1 Base; 5 Film; 9 Image.

What is claimed is:

1. An edible inkjet (IJ) ink comprising:
   (a) water,
   (b) 1 mass % to 30 mass % of titanium oxide particles,
   (c) 0.1 parts by mass or more and 10 parts by mass or less with respect to the titanium oxide particles of at least one dispersant selected from the group consisting of sodium carboxymethyl cellulose, sodium alginate and sodium carbonate,
   (d) 15 mass % or more and 50 mass % or less of propylene glycol, and
   (e) 0.1 mass % or more and 6 mass % or less of at least one water-soluble polysaccharide having a weight average molecular weight smaller than 10,000, the at least one water-soluble polysaccharide is selected from the group consisting of trehalose, reduced isomaltulose, maltodextrine, polydextrose and indigestible dextrin.

2. The edible IJ ink of claim 1, wherein a content of the at least one water-soluble polysaccharide is in a range of 0.1 mass % or more and 5 mass % or less.

3. The edible IJ ink of claim 1, wherein a median diameter D50 of the titanium oxide particles is in a range of 30 nm or more and 800 nm or less, and the titanium oxide particles are dispersed in the edible IJ ink.

4. The edible IJ ink of claim 1, wherein a content of the propylene glycol is in a range of 20 mass % or more and 50 mass % or less.

5. The edible IJ ink of claim 1, wherein the edible IJ ink is used for direct printing on a tablet surface, a soft capsule surface, or a hard capsule surface, or food.

6. A tablet comprising a printed part printed using the edible IJ ink of claim 1.

7. A capsule comprising a printed part printed using the edible IJ ink of claim 1.

8. The tablet of claim 6, characterized in that the tablet is a pharmaceutical tablet.

9. The capsule of claim 7, characterized in that the capsule is a pharmaceutical capsule.

10. The edible IJ ink of claim 1, wherein the ink consists of the water; the titanium oxide particles; the at least one dispersant; the propylene glycol and the water-soluble polysaccharide.

11. The edible IJ ink of claim 1, wherein an amount of the water is from 28.10 mass % to 74.85 mass %.

12. The edible IJ ink of claim 1, wherein the at least one water-soluble polysaccharide is selected from the group consisting of trehalose, reduced isomaltulose and maltodextrine.

13. The edible IJ ink of claim 1, wherein a content of the propylene glycol is in a range of 30 mass % or more and 50 mass % or less.

14. The edible IJ ink of claim 1, wherein the at least one dispersant comprises at least two dispersants selected from the group consisting of sodium carboxymethyl cellulose, sodium alginate and sodium carbonate.

* * * * *